US005501848A

United States Patent [19]
Nakagawa

[11] Patent Number: 5,501,848
[45] Date of Patent: Mar. 26, 1996

[54] METHOD FOR PREPARING CRYSTALLINE ALUMINOPHOSPHATE MATERIALS USING AZAPOLYCYCLIC TEMPLATING AGENTS

[75] Inventor: Yumi Nakagawa, Oakland, Calif.

[73] Assignee: Chevron U.S.A. Inc., San Francisco, Calif.

[21] Appl. No.: 270,695

[22] Filed: Jul. 5, 1994

Related U.S. Application Data

[63] Continuation-in-part of Ser. No. 193,352, Feb. 8, 1994, abandoned.

[51] Int. Cl.$^6$ ............. C01B 37/04; C01B 37/06; C01B 37/08
[52] U.S. Cl. ............. 423/706; 423/708; 423/DIG. 30; 502/208; 502/214
[58] Field of Search ................ 423/706, 708, 423/DIG. 30; 502/208, 214

[56] References Cited

U.S. PATENT DOCUMENTS

| | | | |
|---|---|---|---|
| 3,140,249 | 7/1964 | Plank et al. | 208/120 |
| 3,140,251 | 7/1964 | Plank et al. | 208/120 |
| 3,140,253 | 7/1964 | Plank et al. | 208/120 |
| 4,310,440 | 1/1982 | Wilson et al. | 502/208 |
| 4,440,871 | 4/1984 | Lok et al. | 502/214 |
| 4,508,837 | 4/1985 | Zones | 502/62 |
| 4,544,538 | 10/1985 | Zones | 423/706 |
| 4,567,029 | 1/1986 | Wilson et al. | 423/306 |
| 4,610,854 | 9/1986 | Zones | 423/706 |
| 4,686,093 | 8/1987 | Flanigen et al. | 423/306 |
| 4,910,006 | 3/1990 | Zones et al. | 423/706 |
| 4,913,799 | 4/1990 | Gortsema et al. | 208/89 |
| 4,943,424 | 7/1990 | Miller | 423/708 |
| 4,963,337 | 10/1990 | Zones | 423/706 |
| 4,973,785 | 11/1990 | Lok et al. | 585/481 |
| 5,053,373 | 10/1991 | Zones | 502/64 |
| 5,106,801 | 4/1992 | Zones et al. | 502/64 |
| 5,225,179 | 7/1993 | Zones et al. | 423/709 |
| 5,254,514 | 10/1993 | Nakagawa | 502/60 |
| 5,268,161 | 12/1993 | Nakagawa | 423/702 |
| 5,271,922 | 12/1993 | Nakagawa | 423/702 |
| 5,281,407 | 1/1994 | Nakagawa | 423/706 |
| 5,340,563 | 8/1994 | Zones et al. | 423/706 |
| 5,425,933 | 6/1995 | Nakagawa | 423/706 |

FOREIGN PATENT DOCUMENTS

| | | |
|---|---|---|
| 0040016 | 11/1981 | European Pat. Off. . |
| 0193282 | 9/1986 | European Pat. Off. . |

OTHER PUBLICATIONS

Lok et al. "The Role of Organic Molecules in Molecular Sieve Synthesis" Zeolites vol. 3 pp. 282–291 Oct. 1983.
Helvetica Chimica Acta—vol. 57, Fasc. 6 (1974)–Nr. 168–169–169. "Formation And Properties Of Losod, A New Sodium Zeolite" pp. 1533–1549; W. Sieber et al. No Month.
Elsevier Science Publishers B.V., Amsterdam; Zeolites; Facts, Figures Future; "Sequence Of High Silica Zeolites Found During Synthesis Experiments In The Presence Of A Quaternary Adamantammonium Cation" pp. 299–309; S. I. Zones et al. 1989 No Month.
1985 Butterwoth & Co. Zeolites, 1985, vol. 5, Mar.; "Diamines as templates in zeolite crystallization"; pp. 123–125; E. W. Valyocsik et al.
Nature—vol. 353–Oct. 3, 1991; "Structure of the two-dimensional medium–pore high–silica zeolite NU–87"; pp. 417–420; M. D. Shannon et al.
1989 Butterworth Publishers; Zeolites, 1989, vol. 9, Nov.; "Synthesis of pentasil zeolites from sodium silicate solutions in the presence of quaternary imidazoile compounds"; pp. 458–467; S. I. Zones No Month.
1989 American Chemical Society; "Zeolites: Their Nucleation and Growth"; pp. 11–27; R. M. Barrer No Month.

Primary Examiner—Mark L. Bell
Assistant Examiner—David Sample
Attorney, Agent, or Firm—R. J. Sheridan

[57] ABSTRACT

Molecular sieves, particularly metalloaluminophosphates are prepared using templates derived from a 4-azoniatricyclo[5.2.n.0$^{2,6}$]alkene family of compounds. The templates may be prepared in a series of reaction steps which include a Diels-Alder reaction between a diene and a dienophile.

58 Claims, No Drawings

METHOD FOR PREPARING CRYSTALLINE ALUMINOPHOSPHATE MATERIALS USING AZAPOLYCYCLIC TEMPLATING AGENTS

This application is a continuation-in-part of application Ser. No. 193,352, filed Feb. 8, 1994 now abanonded.

BACKGROUND OF THE INVENTION

1. Field of the Invention

The present invention relates to a new method for synthesizing crystalline molecular sieves using a family of templating agents.

2. Background

The crystalline materials of this invention contain metallic and non-metallic oxides bonded through oxygen linkages to form a three-dimensional structure. Molecular sieves are a commercially important class of crystalline materials. Natural and synthetic crystalline molecular sieves are useful as catalysts and adsorbents. They have distinct crystal structures with ordered pore structures which are demonstrated by distinct X-ray diffraction patterns. The crystal structure defines cavities and pores which are characteristic of the different species. The adsorptive and catalytic properties of each molecular sieve are determined in part by the dimensions of its pores and cavities. Thus, the utility of a particular molecular sieve in a particular application depends at least partly on its crystal structure.

Because of their unique sieving characteristics, as well as their catalytic properties, molecular sieves are especially useful in such applications as gas drying and separation and hydrocarbon conversion. Although many different molecular sieves have been disclosed, there is a continuing need for new materials with desirable properties for gas separation and drying, hydrocarbon and chemical conversions, and other applications.

Aluminophosphate molecular sieves containing $[AlO_2]$ and $[PO_2]$ units have been disclosed in U.S. Pat. No. 4,310,440, issued Jan. 12, 1982 to Wilson et al. Silicoaluminophosphates having a three-dimensional crystal framework of $PO_2^+$, $AlO_2^-$ and $SiO_2$ tetrahedral units are taught in U.S. Pat. No. 4,440,871, issued Apr. 3, 1984 to Lok et al. Aluminophosphates containing $[AlO_2]$ and $[PO_2]$ structural units, and one or more metals in tetrahedral coordination with oxygen atoms are disclosed in U.S. Pat. No. 4,567,029, issued Jan. 28, 1986 to Wilson et al. The '029 reference teaches using the metals magnesium, manganese, zinc, and cobalt, and uses the nomenclature "MeAPO" to identify these metal aluminophosphate materials. U.S. Pat. No. 4,686,093, issued Aug. 11, 1987 to Flanigen et al., describes aluminophosphates containing at least two elements selected from arsenic, beryllium, boron, chromium, gallium, germanium, lithium and vanadium. U.S. Pat. No. 4,913,799, issued Apr. 3, 1990 to Gortsema et al., discloses a large number of aluminophosphates for use in hydrocracking processes. The aluminophosphates of '799 contain $[AlO_2]$ and $[PO_2]$ structural units, and one or more metals in tetrahedral coordination, including arsenic, beryllium, boron, chromium, cobalt, gallium, germanium, iron, lithium, magnesium, manganese, silicon, titanium, vanadium, and zinc. U.S. Pat. No. 4,973,785, issued Nov. 27, 1990 to Lok et al., expands the list of aluminophosphates, and teaches the use for converting hydrocarbons using silicoaluminophosphates containing at least one element, "EL" capable of forming a three dimensional oxide framework having a mean "EL—O" distance in tetrahedral oxide structures between 1.51 Å and 2.06 Å, where "EL" has a cation electronegativity between 125 to 310 kcal/g-atom, and is capable of forming stable EL—O—P, EL—O—Al or El—O—El bonds in crystalline three dimensional oxide structures having an "EL—O" bond dissociation energy greater than about 59 kcal/mole at 289° C.

Organic templating agents are believed to play an important role in the process of molecular sieve crystallization. Organic amines and quaternary ammonium cations were first used in the synthesis of zeolites in the early 1960's. This approach led to a significant increase in the number of new zeolitic structures discovered as well as an expansion in the boundaries of composition of the resultant crystalline products.

Unfortunately, the relationship between structure of the organocation and the resultant zeolite is far from predictable, as evidenced by the multitude of products which can be obtained using a single quaternary ammonium salt as reported by S. I. Zones et al., 1989, Zeolites: *Facts, Figures, Future*, ed. P. A. Jacobs and R. A. van Santen, pp. 299–309, Amsterdam: Elsevier Science Publishers., or the multitude of organocations which can produce a single zeolitic product as reported by R. M. Barter, 1989, *Zeolite Synthesis*, ACS Symposium 398, ed. M. L. Occelli and H. E. Robson, pp. 11–27, American Chemical Society.

Thus, it is known that organocations exert influence on the molecular sieve crystallization processes in many unpredictable ways. Aside from acting in a templating role, the organic cation's presence also greatly affects the characteristics of the gel. These effects can range from modifying the gel pH to altering the interactions of the various components via changes in hydration (and thus solubilities of reagents) and other physical properties of the gel. Accordingly, investigators have now begun to consider how the presence of a particular quaternary ammonium salt influences many of these gel Characteristics in order to determine more rigorously how such salts exert their templating effects.

It has been noted that many of the organocations which have been used as templates for zeolite synthesis are conformationally flexible. Thesemolecules can adopt many conformations in aqueous solution, therefore several templates can give rise to a particular crystalline product. Studies which involved alterations on such conformationally flexible organic amines and cations have been published. For example, one study, Rollmann and Valyocsik, 1985, *Zeolites* 5, 123, describes how varying the chain length for a series of α,ω-linear diamines resulted in different intermediate-pore products. It has also been recently reported by M. D. Shannon et al., 1991, *Nature* 353, 417–420 and J. L. Casci, 1986, New Developments in *Zeolite Science* and *Technology*, ed. Y. Murakami et al., pp. 215–222, Elsevier that three different-products which have related framework topologies., can be formed from three linear his-quaternary ammonium templates of varying chain lengths.

Altering the structure of a conformationally rigid organic molecule can also lead to a change in the zeolite obtained, presumably due to the differing steric demands of each template. S. I. Zones, 1989, *Zeolites* 9, 458–467 reported that in switching from 1,3-dimethylimidazolium hydroxide to 1,3-diisopropylimidazolium hydroxide as template, using the same starting gel ($SiO_2/Al_2O_3$=100), the former directs toward formation of ZSM-22 whereas the latter affords ZSM-23.

In summary, a variety of templates have been used to synthesize a variety of molecular sieves, including zeolites, aluminophosphates, and silicoaluminophosphates.

Though the specific utility of a given template is at present unpredictable, a few notable cyclic-organocation templating agents have been reported. For instance, use of N,N,N-trimethyl cyclopentylammonium iodide in the preparation of Zeolite SSZ-15 molecular sieve is disclosed in U.S. Pat. No. 4,610,854, issued Sep. 9, 1986 to Zones; use of 1-azoniaspiro [4.4] nonyl bromide and preparation of a molecular sieve termed "Losod" is disclosed in *Hel. Chim. Acta* (1974), Vol. 57, page 1533 (W. Sieber and W. M. Meier); use of 1,ω-di(1-azoniabicyclo [2.2.2.] octane) lower alkyl compounds in the preparation of Zeolite SSZ-16 molecular sieve is disclosed in U.S. Pat. No. 4,508,837, issued Apr. 2, 1985 to Zones; use of N,N,N-trialkyl-1 adamantammonium salts in the preparation of zeolite SSZ-13 molecular sieve is disclosed in U.S. Pat. No. 4,544,538, issued Oct. 1, 1985 to Zones. U.S. Pat. No. 5,053,373, issued Oct. 1, 1991 to Zones discloses preparing SSZ-32 with an N-lower alkyl-N'-isopropyl-imidazolium cation templating agent. U.S. Pat. No. 5,106,801, issued Apr. 21, 1992 to Zones et al. discloses a cyclic quaternary ammonium ion, and specifically a tricyclodecane quaternary ammonium ion, for the preparation of the metallosilicate zeolite SSZ-31. U.S. Pat. No. 4,910,006, issued March 20, 1990 to Zones et al., teaches using a hexamethyl[4.3.3.0]propellane-8,11-diammonium cation for the preparation of SSZ-26. EP 0193282 discloses a tropinium cation for preparing the clathrasil ZSM-58. Similarly, use of quinuclidinium compounds to prepare a zeolite termed "NU-3" is disclosed in European Patent Publication No. 40016.

The use of 1,4-diazabicyclo[2,2,2]octane; N,N'-dimethyl-1,4 diazabicyclo[2,2,2]octane dihydroxide; and quinuclidine are examples of amines taught in U.S. Pat. No. 4,310,440, issued January 12, 1982 to Wilson et al., and U.S. Pat. No. 4,440,871, issued Apr. 3, 1984 to Lok et al. for the preparation of aluminophosphates and silicoaluminophosphates respectively.

SUMMARY OF THE INVENTION

This invention provides a novel process for preparing crystalline materials, particularly molecular sieves having framework structures comprising [AlO$_2$] and [PO$_2$] units. This process includes contacting active sources of the components of the crystalline materials with an organocationic templating agent which is derived from a 4-azonia-tricyclo [5.2.n.0$^{2,6}$]alkene family of compounds, wherein each member of the family is a compound which may be prepared via a Dieis-Alder reaction pathway.

More specifically, a method is provided for preparing a crystalline molecular sieve comprising oxides of one or more trivalent element(s) and oxides of one or more pentavalent element(s), said method comprising contacting under crystallization conditions one or more active sources of said oxides with a templating agent having a molecular structure of the form:

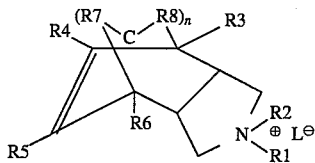
(I)

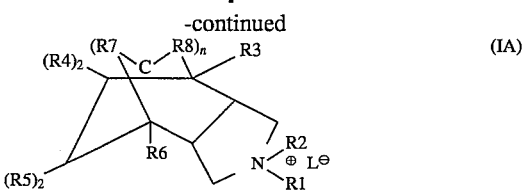

wherein:
R1 and R2 are at each independent occurrence selected from the group consisting of hydrogen, a lower alkyl group, and when taken together, a spirocyclic group having from 3 to 6 carbon atoms;

R3, R4, R5 and R6 are at each independent occurrence selected from the group consisting of hydrogen, halogen, and a lower alkyl group;

n has at each independent occurrence a value of 1, 2, 3, or 4;

R7 and R8 are at each independent occurrence selected from the group consisting of hydrogen and a lower alkyl group, and when n is one (1), R7 and R8 can be taken together to form a spirocyclic group having from 3 to 6 carbon atoms; and when n is two (2) or greater, one of R7 and R8 on one carbon atom can be taken together with one of R7 and R8 on an adjacent carbon atom to form a ring having from 3 to 6 carbon atoms; and L is an anion which is not detrimental to the formation of the molecular sieve, such as anions including halogens, such as fluoride, chloride, bromide, and iodide, hydroxide, acetate, sulfate, carboxylate, with hydroxide being most preferred, or a molecular structure of the form:

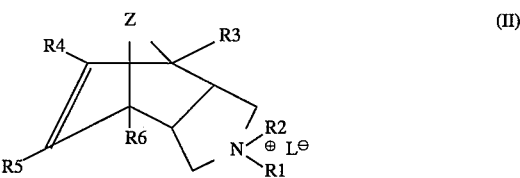

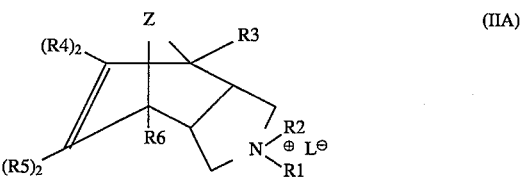

wherein:
Z is at each independent occurrence selected from the group consisting of oxygen, nitrogen, sulfur, and a hydrocarbyl (e.g., alkylene, alkylidene, substituted alkylene and the like having i to about 6 carbon atoms) radical; and R1, R2, R3, R4, R5, R6, and L are as defined above.

Aza-polycyclic compounds encompassed by this formula are hereinafter referred to as the "defined aza-polycyclic templating agents".

The molecular sieve of this invention has a three-dimensional microporous framework structure comprising [AlO$_2$] and [PO$_2$] oxide units. The molecular sieve may additionally comprise an oxide of at least one element other than aluminum and phosphorous which is capable of forming an oxide in tetrahedral coordination with [AlO$_2$] and [PO$_2$] oxide structural units in the molecular sieve. The preferred elements other than aluminum and phosphorous are selected from the group consisting of arsenic, beryllium, boron, chromium, cobalt, gallium, germanium, iron, lithium, magnesium, manganese, silicon, titanium, vanadium, and zinc. Silicon, magnesium, manganese, cobalt, and zinc are more preferred, with silicon being particularly preferred.

The present invention is also directed to a crystalline molecular sieve comprising oxides of one or more trivalent element (s) and of one or more pentavalent element (s), and having therein the defined aza-polycyclic templating agent.

Preferably, the molecular sieve has a molar composition, as synthesized and in the anhydrous state, as follows:

$$aQ:(M_xAl_yP_z)O_2$$

wherein:

Q is the defined aza-polycyclic templating agent having a molecular structure of the form shown in Structure I, IA, II or IIA above;

a has a value in the range of greater than zero and no greater than about 0.3;

M is one or more elements capable of forming stable M—O—P, M—O—Al, or M—O—M bonds in crystalline oxide structures;

y and z each have a value of at least 0.01; and the sum of x, y, and z is 1.

Among other factors, the present invention is based on the discovery that small changes in structure within this family of relatively rigid, polycyclic templating agents, when the template is used in molecular sieve synthesis, can lead to significant changes in the crystalline molecular sieve formed.

DETAILED DESCRIPTION OF THE INVENTION

In preparing a crystalline material according to the present invention, a defined aza-polycyclic compound, having a general molecular structure of the form shown in Structure I above, acts as a template or structure directing agent during the crystallization. Typically, the defined aza-polycyclic templating agent is prepared in a series of reaction steps comprising a Dieis-Alder reaction between a diene and a dienophile.

In another embodiment is the molecular sieve, in its as-synthesized form containing the defined aza-polycyclic templating agent.

In the method of this invention the family of aza-polycyclic cations can be used to synthesize different aluminophosphate materials depending on the reagents, reactant ratios and reaction conditions. For example, factors which may affect the crystallization of a given aluminophosphate include the specific defined aza-polycyclic template used, the type and ratio of inorganic reagents used, the methods used in mixing reagents and the temperature and time used in crystallization.

The full scope of the composition and process of the present invention will be apparent to those familiar with crystalline molecular sieves and their methods of preparation from the following detailed description of the principal features of the composition and from the examples which accompany the description.

THE TEMPLATING AGENT

The templating agents useful in the present process are derived from the 4-azonia-tricyclo[5.2.n.0$^{2,6}$]alkene family of compounds, where n is a number and has a value of 1, 2, 3, or 4. The templating agent has a molecular structure of the general form:

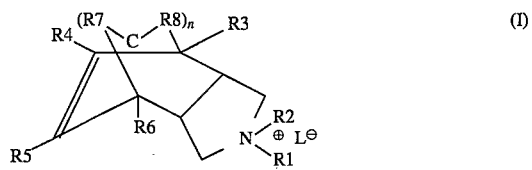

(I)

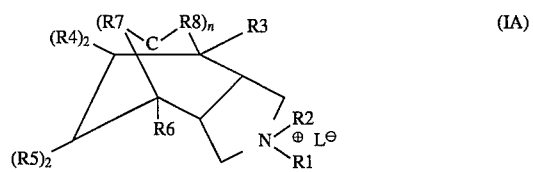

(IA)

wherein R1, R2, R3, R4, R5, R6, R7, R8, L and n are as defined above.

The templating agent may also have a molecular structure of the general form:

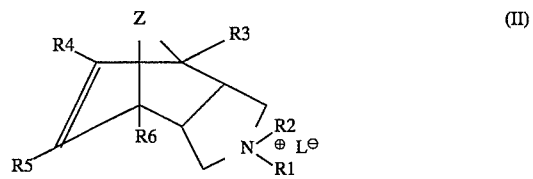

(II)

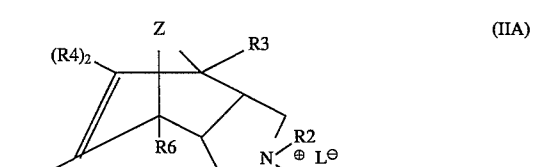

(IIA)

wherein R1, R2, R3, R4, R5, R6, Z and L are as defined above.

Preferably, R1 and R2 are each selected from the group consisting of hydrogen, an alkyl group having from 1 to 3 carbon atoms, and when taken together, a spirocyclic group having from 3 to 6, more preferably from 4 to 5, carbon atoms.

Preferably, R3, R4, R5 and R6 are each selected from the group consisting of hydrogen, halogen, and an alkyl group having from 1 to 3 carbon atoms.

Preferably, R7 and R8 are each selected from the group consisting of hydrogen and an alkyl group having from 1 to 3 carbon atoms, and when n is one (1), R7 and R8 can be taken together to form a spirocyclic group having from 3 to 6, more preferably from 3 to 5, carbon atoms; and when n is two (2) or greater, one of R7 and R8 on one carbon atom can be taken together with one of R7 and R8 on an adjacent carbon atom to form a ring having from 3 to 6, more preferably from 3 to 5, carbon atoms.

As used herein, the term "halogen" refers to fluorine, chlorine, bromine, iodine and combinations thereof. The term "lower alkyl group" refers to a linear, branched, or cyclic alkyl group having from 1 to 6 carbon atoms. The term "spirocyclic group" refers to a cyclic group in a polycyclic hydrocarbon having one carbon atom in common with a second cyclic group. L is an anion which is not detrimental to the formation of the molecular sieve. Representative anions include halogens, such as fluoride, chloride, bromide, and iodide, hydroxide, acetate, sulfate, carboxylate. Hydroxide is the most preferred anion. It may be beneficial to ion exchange, for example, the halide for hydroxide ion, thereby reducing or eliminating the alkali metal hydroxide quantity required.

Many of the organocations which have been previously used as templates for molecular sieve synthesis are conformationally flexible. These molecules adopt many conformations in aqueous solution, and several templates can give rise to a
single crystalline product. In contrast, the defined aza-polycyclic templating agents used in the present invention are conformationally rigid organic molecules. Altering the structure of these rigid molecules can lead to a change in the molecular sieve obtained, presumably due to the differing steric demands of each template. In particular, it has been found that the present templating agents are useful for synthesizing large pore molecular sieves, which are important for certain catalytic applications.

Increasing the steric demand of the template may lead to a decrease in crystallization rate as well as a decrease in template solubility in the reaction mixture. If the template is not sufficiently soluble, it will be difficult to form crystals in the reaction mixture. Addition of a surfactant to the reaction mixture may help to solubilize the template.

Employing a Dieis-Alder reaction scheme, using inexpensive reagents, is the preferred method for preparing the present templating agents. The Dieis-Alder reaction is one of the most useful transformations in synthetic organic chemistry. Two new bonds and a six-membered ring are formed in the Dieis-Alder reaction, formally a [4+2]cycloaddition of a 1,4-conjugated diene with a double bond (dienophile). The dienophile may include a carbon-carbon, carbon-heteroatom, or heteroatom-heteroatom double (or triple) bond, leading to a diverse pool of potential templating agents. Electron-withdrawing groups on the dienophile greatly increase its reactivity, whereas electron-donating groups on the diene have the same effect. The Dieis-Alder reaction is discussed in greater detail in F. Fringuelli and A. Taticchi, Dienes in the *Dieis-Alder Reaction* 1990, J. Wiley and Sons, Inc.

The versatility of the Dieis-Alder reaction is in part responsible for its usefulness. A wide range of starting materials are available, making possible the preparation of numerous products. The stereoelectronics of the reaction, as well as its concerted nature, often allows one to predict which product will be formed if several are possible. Therefore, by the proper choice of starting materials, very efficient syntheses of target templates can be achieved.

In particular, the Dieis-Alder reaction pathway provides a method for synthesizing the defined aza-polycyclic ring systems which are useful in the present process. Varying either the diene or the dienophile produces small but significant structural changes to the key intermediates in the synthesis.

The dienes useful for preparing the defined aza-polycyclic templates are of the following general form:

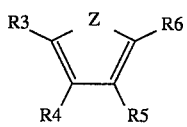

(III)

wherein R3, R4, R5, R6, and Z are as defined above.

In a further embodiment, the dienes useful for preparing the defined aza-polycyclic templates have the following form:

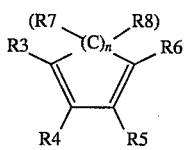

(IV)

wherein R3, R4, R5, R6, R7, R8, and n are as defined above.

Examples of cyclic dienes having a carbon backbone include cyclopentadiene, 1,3-cyclohexadiene, 1,3-cycloheptadiene, 1,3-cycloheptatriene, spiro[2,4]hepta-4,6-diene, and 1,3-cyclooctadiene. The diene of Structure III may also include one or more heteroatoms in the cyclic backbone, including oxygen, nitrogen, and/or sulfur. Oxygen is preferred. Non-limiting examples of heterodienes which are used in preparing the templating agent include furan, pyrrol, and thiophene. Examples of functional groups R7 and R8 in Structure IV are hydrogen, methyl, ethyl, propyl, and cyclopropyl.

The dienophile from which the present templating agent is prepared has a structure of the general form:

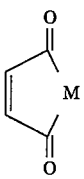

(V)

wherein X is either oxygen or nitrogen having a substituent group selected from the group consisting of hydrogen and a lower alkyl group.

The defined aza-polycyclic compounds are prepared by methods known in the art. The reactions involved are described in detail in, for example, *Chem. Pharm. Bull.* (1962), 10, 714–718, L. F. Fieser and M. Fieser, 1967, Reagents for *Organic Synthesis*, vol 1, pp. 581–594, New York: J. Wiley and Sons, Inc. and W. K. Anderson and A. S. Milowsky, 1985, *J. Org. Chem.* 50,5423–24. When a diene, such as that shown in Structure IV above, is reacted with a dienophile such as that shown in Structure V, element M is oxygen, the resulting product is reacted with an amine to form an imide, then reduced to the corresponding pyrrolidine using a reducing agent such as lithium aluminum hydride, and then quaternized with, for example methyl iodide, to form the defined aza-polycyclic templating agent.

When the diene of Structure III or IV above, is reacted with a dienophile of Structure V, wherein element M is nitrogen having a lower alkyl substituent group, the resulting imide product is directly reduced to the corresponding pyrrolidine and then quaternized to form the cationic templating agent.

The double bond shown in Structures I and II above is not critical to the action of the defined aza-polycyclic compound as a templating agent, and may be reduced, using techniques readily available in the art, such as, for example, by reaction over a palladium/carbon or a platinum/carbon catalyst in the presence of hydrogen. The reduced compound will also serve as a templating agent in the present method.

THE REACTION MIXTURE

The molecular sieves of this invention can be prepared from an aqueous solution comprising sources of one or more trivalent elements, one or more pentavalent elements and the defined aza-polycyclictemplating agents of this invention. Typically, the trivalent element will be aluminum and the pentavalent element will be phosphorus. The reaction mixture may optionally can sources of another element(s) (M) capable of forming stable M—O—P, M—O—Al or M—O—P bonds in the molecular sieve crystalline oxide structure.

In general, the reaction mixture should have a composition, in terms of mole ratios of oxides, within the ranges shown below. For convenience, aluminum has been used as the trivalent element and phosphorus as the pentavalent element, but it is not intended that the tri- and pentavalent elements be limited to those elements.

$Al_2O_3:0.8–1.2PO_2:0–0.4MO_w:0.5Q_2O:120–140H_2O$ where M is the element (typically silicon) capable of forming the stable M—O—Al, M—O—P or M—O—M bonds, w is 1 or 2, and Q is the defined aza-polycyclic templating agent.

CRYSTALLINE MATERIALS OF THIS INVENTION

The crystalline material of this invention comprises the defined aza-polycyclic templating agent in combination with one or more metallic and/or non-metallic oxides bonded in tetrahedral coordination through shared oxygen atoms to form a cross-linked three dimensional crystal structure. The metallic and non-metallic oxides comprise one or more trivalent element(s) and one or more pentavalent element(s). The trivalent element is preferably aluminum and the pentavalent element is preferably phosphorous. The entire lattice is charge balanced.

The term "molecular sieve" refers to a material prepared according to the present invention having a fixed, open-network structure, usually crystalline, that may be used to separate hydrocarbons or other mixtures by selective occlusion of one or more of the constituents, or may be used as a catalyst in a catalytic conversion process.

The term "metalloaluminophosphate" encompasses crystalline molecular sieves comprising tetrahedrally-bound $[AlO_2]$ and $[PO_2]$ oxide structural units. Examples include crystalline aluminophosphates having a chemical composition, in oxide mole ratios, of $Al_2O_3:1.0\pm0.2\ P_2O_5$. Optionally, the crystalline metalloaluminophosphate may further comprise, in addition to aluminum and phosphorous, tetrahedrally-bound oxide units of one or more elements which are capable of forming tetrahedral oxide units with the $[AlO_2]$ and $[PO_2]$ units, including arsenic, beryllium, boron, chromium, cobalt, gallium, germanium, iron, lithium, magnesium, manganese, silicon, titanium, vanadium, and zinc.

Typically, the crystalline material has a molar composition, as synthesized and in the anhydrous state, as follows:

$aQ:(M_xAl_yP_z)O_2$ wherein:

Q is the defined aza-polycyclic templating agent having a molecular structure of the form shown in Structure I, IA, II or IIA above;

a has a value in the range of greater than zero and no greater than about 0.3;

M is one or more elements capable of forming stable M—O—P, M—O—Al, or M—O—M bonds in crystalline oxide structures;

y and z each have a value of at least 0.01; and the sum of x, y, and z is 1.

The crystalline material can be suitably prepared from an aqueous solution containing at least one defined aza-polycyclic templating agent, and sources of at least one oxide capable of forming a crystalline molecular sieve. Examples of a suitable metal oxide include an alkali metal oxide, and oxides of aluminum, silicon, boron, germanium, iron, gallium, phosphorous, arsenic, beryllium, chromium, cobalt, gallium, magnesium, manganese, titanium, vanadium, and zinc.

The present process is suitable for preparing a metalloaluminophosphate molecular sieve from a reaction mixture prepared using standard preparation techniques. Aluminophosphates and the conventional preparation thereof are described in U.S. Pat. No. 4,310,440, issued Jan. 12, 1982 to Wilson et al., the disclosure of which is incorporated herein by reference. Silicoaluminophosphates and the conventional preparation thereof are described in U.S. Pat. No. 4,440,871, issued April 3, 1984 to Lok et al., and U.S. Pat. No. 4,943,424, issued Jul. 24, 1990 to Miller, the disclosures of which are incorporated herein by reference. Metalloaluminophosphates and the convention preparation thereof are described in U.S. Pat. No. 4,913,799, issued Apr. 30, 1990 to Gortsema et al., the disclosure of which is incorporated by reference. In the '799 patent the metalloaluminophosphates are termed "non-zeolitic molecular sieve".

The preferred source of aluminum for the crystalline aluminophosphate and metal aluminophosphate molecular sieves of this invention is an aluminum alkoxide or hydroxide such as aluminum isopropoxide or pseudo-boehmite. Phosphoric acid is the preferred source of phosphorous. Organic phosphates and crystalline aluminophosphates can also be employed as a source of phosphorous. Typical sources of silicon oxide include silicates, silica hydrogel, silicic acid, colloidal silica, tetra-alkyl orthosilicates, and silica hydroxides. Sources of the other oxides typically include salts which are soluble in the reaction mixture.

In preparing the crystalline material under crystallization conditions according to the present invention, the reaction mixture is maintained under hydrothermal conditions at an elevated temperature until crystals are formed. The temperatures during the hydrothermal crystallization/step are typically maintained from about 50° C. to about 200° C.

The crystallization period is typically greater than 1 day and preferably from about 3 days to about 50 days.

The hydrothermal crystallization is usually conducted under pressure and usually in an autoclave so that the reaction mixture is subject to autogenous pressure. The reaction mixture can be stirred during crystallization.

More specifically, the synthesis method for preparing metalloaluminophosphates comprises:

(a) preparing an aqueous reaction mixture containing pseudo-boehmite and phosphoric acid, thereafter combining the aqueous reaction mixture with an organic templating agent and optionally adding active source(s) of one or more additional elements capable of forming oxides in tetrahedral coordination with $[AlO_2]$ and $[PO_2]$ units, to form the complete reaction mixture in the-relationship herein before set forth;

(b) heating the complete reaction mixture to a temperature in the range of from 50° C. to 240° C. and preferably from 100° C. to 200° C. until crystals are formed, usually from 5 hours to 500 hours and preferably 24 to 480 hours; and (c) recovering the crystalline product.

Once the crystals have formed, the solid product is separated from the reaction mixture by standard mechanical separation techniques, such as filtration. The crystals are water-washed and then dried, e.g., at 90° C. to 150° C. for from 8 to 24 hours, to obtain the synthesized molecular sieve crystals. The drying step can be performed at atmospheric or subatmospheric pressures.

During the hydrothermal crystallization step, the crystals can be allowed to nucleate spontaneously from the reaction mixture. The reaction mixture can also be seeded with crystals both to direct, and accelerate the crystallization, as well as to minimize the formation of undesired contaminants. If the reaction mixture is seeded with crystals, the concentration of the defined aza-polycyclic template may sometimes be somewhat reduced.

Due to the unpredictability of the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture composition or to the reaction conditions, such as temperature and/or crystallization time. Making these modifications are well within the capabilities of one skilled in the art.

The crystalline material can be thermally treated (calcined). Usually, it is desirable to remove residual cations by ion exchange, replacing them with hydrogen, ammonium, or any desired metal ion. The molecular sieve can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Fd, Ni, Co, Ti, Al, Sn, and Fe are particularly preferred.

The hydrogen, ammonium, and metal components can be exchanged into the molecular sieve. The molecular sieve can also be impregnated with the metals, or, the metals can be physically intimately admixed with the molecular sieve using standard methods known to the art. The metals can also be occluded in the crystal lattice by having the desired metals present as ions in the reaction mixture from which the molecular sieve is prepared.

Typical ion exchange techniques involve contacting the synthetic molecular sieve with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249, issued Jul. 7, 1964 to Plank et al.; 3,140,251, issued Jul. 7, 1964 to Plank et al.; and 3,140,253, issued Jul. 7, 1964 to Plank et al. Ion exchange can take place before or after the molecular sieve is calcined.

Following contact with the salt solution of the desired replacing cation, the molecular sieve is typically washed with water and dried at temperatures ranging from 65° C. to about 315° C. After washing, the molecular sieve can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of the molecular sieve, the spatial arrangement of the atoms which form the basic crystal lattice of the aluminophosphate remains essentially unchanged. The exchange of cations has little, if any effect on the molecular sieve lattice structures.

The molecular sieve can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminophosphate can be extruded before drying, or, dried or partially dried and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be naturally occurring or may be in the form of gelatinous precipitates, sols, or gels, including mixtures of silica and metal oxides. Use of an active material in conjunction with the synthetic molecular sieve, combined with it, can improve the conversion and selectivity of the catalyst in certain organic conversion processes. Inactive materials can serve as diluents to control the amount of conversion in a given process so that products can be formed economically without using other means for controlling the rate of reaction. Frequently, molecular sieve materials have been incorporated into naturally occurring clays, e.g., bentonite and kaolin. These materials, i.e., clays, oxides, etc., function, in part, as binders for the catalyst. It is desirable to provide a catalyst having good crush strength and attrition resistance, because in petroleum refining the catalyst is often subjected to rough handling. This tends to break the catalyst down into powders which cause problems processing.

Naturally occurring clays which can be composited with the synthetic molecular sieves of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Various clays such as sepiolite and attapulgite can also be used as supports. Such clays can be used in the raw state as originally mined or can be calcined, treated with acid, or chemically modified.

In addition to the foregoing materials, the molecular sieve can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The molecular sieve can also be composited with zeolites such as synthetic and natural faujasites (e.g., X and Y), erionites, and mordenites. They can also be composited with purely synthetic zeolites. The combination of molecular sieves and zeolites can also be composited in a porous inorganic matrix.

The materials prepared in accordance with this invention are useful as molecular sieves, catalysts and/or catalyst carriers.

The following examples demonstrate but do not limit the present invention.

EXAMPLES

Examples 1–11 show that one can make a wide range of templates using the methodology described above. In each of Examples 1–11, the anion L may be either $I^-$ or $OH^-$.

EXAMPLE 1

Dieis-Alder adduct:

The diene cyclopentadiene was obtained by cracking dicyclopentadiene in a 1-L round bottomed flask fitted with a 30-cm Vigreux column, following the procedure in R. B. Moffett, 1963, *Organic Syntheses Coil. Vol IV, ed.* N. Rabjohn, pp. 238–241, New York: J. Wiley and Sons, Inc. The cyclopentadiene product was distilled from the cracking vessel and recovered. A 2-L, 3-necked flask was equipped with a magnetic stir bar, reflux condenser and thermometer.

The flask was charged with cyclopentadiene (295 grams, 4.46 mol) and benzene (1.4 L). The dienophile N-methylmaleimide (30.1 grams, 0.45 mol) was added at room temperature (exotherm noted), and the homogeneous yellow solution was heated to reflux for 24 hours. Thin layer chromatography (silica, 40% ethyl acetate/hexane) was used to monitor the disappearance of maleimide. The reaction mixture was concentrated by rotary evaporation to yield a mixture of oil and solid products, which was taken up in 200M of $CH_2Cl_2$ and transferred to a separatory funnel. Water (200 Ml) was added and the pH of the aqueous layer adjusted to $\leq 1$ using conc. HCl. The phases were separated and the organic phase was washed once more with $H_2O$ (200 Ml). After drying over $MgSO_4$, the organic phase was filtered and concentrated to yield an oil and solid mixture which was recrystallized from 500 Ml of hot $Et_2O$. The ethereal solution was placed in the refrigerator overnight and the resulting white crystals of the Dieis-Alder imide were collected by vacuum filtration and washed with a small amount of cold ether (65.43 grams, 82% yield, mp 103–105° C.).

Reduction of Diels-Alder imide:

A 3-L, 3-necked flask was fitted with a mechanical stirrer, addition funnel and reflux condenser. The Dieis-Alder imide (61.5 grams, 0.35 mol) was dissolved in 495 mL of $CH_2Cl_2$ in the addition funnel. The flask was charged with $LiAlH_4$ (41.6 grams, 1.04 mol) and anhydrous $Et_2O$ (990 mL) and the system was placed under $N_2$. The imide solution was added slowly to the $LiAlH_4$ suspension. Gas evolution and an exotherm were noted. Addition of the imide solution was complete after approximately 1 hour and the grey heterogenous solution was allowed to stir under $N_2$ overnight. Thin layer chromatography (silica plates, 5% $MeOH/95\%$ $CH_3Cl$) indicated the absence of starting material. The reaction was carefully worked up in the following manner: 38.5 mL of $H_2O$ was added slowly to the reaction. Vigorous gas evolution was noted as well as an exotherm. This step was followed by the cautious addition of 38.5 mL of 15% aqueous NaOH solution. Another 115 mL of $H_2O$ was added and the mixture, which turned from grey to white, was stirred for 1 hour at room temperature. The solids were removed by filtration and washed with $CH_2Cl_2$. The aqueous layer was acidified with conc. HCl to $pH \leq 1$ and the non-basic organic impurities removed in the organic phase. The aqueous layer was then made basic ($pH \leq 12$) with 50% NaOH and the crude tertiary amine was isolated by extracting twice with $CH_2Cl_2$. The organic layers were combined and dried over $MgSO_4$. Following filtration, the solution was concentrated to yield 41.4 g (52%) of the amine, which was taken directly to the next step. IR and $^{13}C$ NMR spectroscopy could be used to monitor the disappearance of the imide functionality (1700 $cm^{-1}$ and 177.5 ppm, respectively).

Quaternization of the 4-Methyl-4-aza-tricyclo[5.2.1.0]dec-8-ene:

The amine (15.0 grams, 0.10 mol) was dissolved in 100 mL of $CHCl_3$ in a 250-mL round-bottomed flask which was equipped with an addition funnel and magnetic stirrer. The reaction 24 flask was immersed in an ice bath and the addition funnel charged with $CH_3I$ (28.7 grams, 0.20 mol). The $CH_3I$ was added to the amine over a 10-minute period (exothermic reaction) and the homogeneous solution was stirred at room temperature for 3 days. Diethyl ether (100 mL) was added to the reaction mixture and the yellow solids were collected by filtration and washed with more ether. These solids were recrystallized from hot acetone/$Et_2O$ (a small amount of MeOH was added to aid in dissolution of solid) to afford 21.2 grams of an aza-polycyclic compound having an iodide anion. Bio-Rad AG1-X8 anion exchange resin was used to convert the iodide salt to the corresponding hydroxide form in 90.5% yield. The yield of the conversion was based upon titration of the resultant solution using phenolphthalein as the indicator.

The aza-polycyclic templating agent of Example I had the structure shown below.

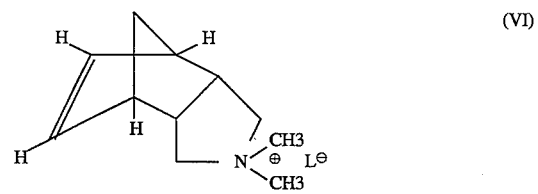

EXAMPLE 2

Example 1 was repeated, except N-ethylmaleimide was used as the dienophile and $CH_3CH_2I$ was used instead of $CH_3I$ in the quaternization step. The resulting product had the structure of Structure VII below, with the alkyl groups surrounding the positively charged nitrogen being ethyl rather than methyl.

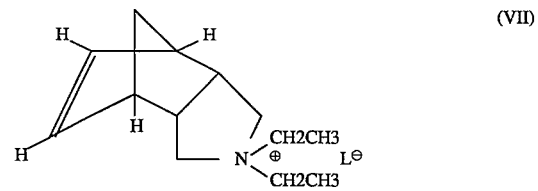

EXAMPLE 3

Example 2 was repeated, except $CH_3I$ was used in the quaternization step, giving a cationic templating agent Structure VIII.

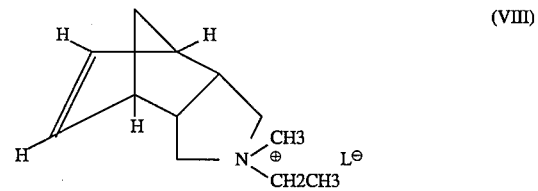

EXAMPLE 4

Example 1 was repeated, except spiro[2.4]hepta-4,6-diene was used as the diene; $AlCl_3$ was used as a Lewis acid, and the reaction was not heated. In the resulting Structure IX the bridging carbon is part of a spirocyclic cyclopropyl group.

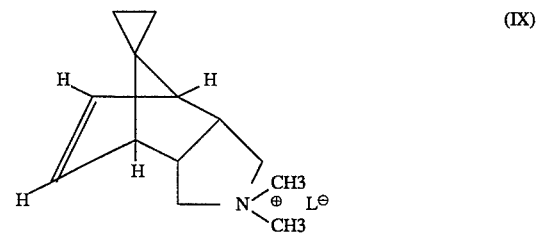

EXAMPLE 5

Example 4 was repeated, except N-ethylmaleimide was used as the dienophile and $CH_3CH_2I$ was used instead of $CH_3I$ in the quaternization step, to give Structure X.

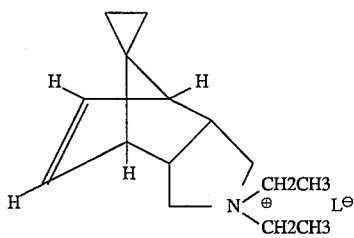

EXAMPLE 6

Example 1 was repeated, except 1,3-cyclohexadiene was used as the diene and toluene was used as the solvent. In the resulting Structure XI the bridging radical has been expanded from one to two carbon atoms.

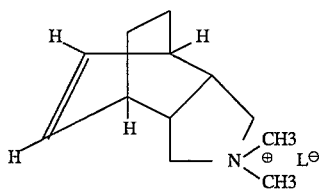

EXAMPLE 7

Example 6 was repeated, except N-ethylmaleimide was used as the dienophile and $CH_3CH_2I$ was used instead of $CH_3I$ in the quaternization step to give Structure XII.

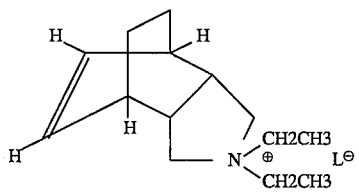

EXAMPLE 8

Example 7 was repeated, except $CH_3I$ was used in the quaternization step to give Structure XIII.

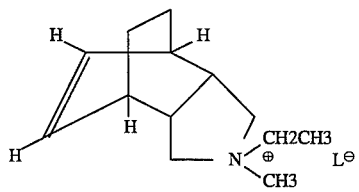

EXAMPLE 9

Example 6 was repeated, except 1-3,cycloheptadiene was used as the diene, and the reaction was heated for four (4) days to give Structure XIV.

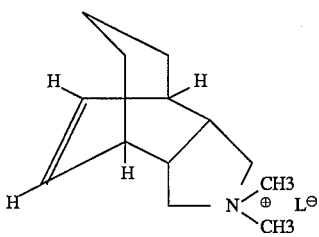

EXAMPLE 10

Example 9 was repeated, except $CH_3CH_2I$ was used instead of $CH_3I$ in the quaternization step to give Structure XV.

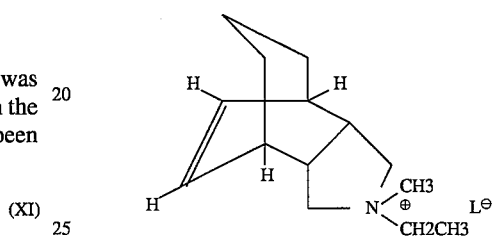

EXAMPLE 11

Example 6 was repeated, except cycloheptatriene was used as the diene to give Structure XVI.

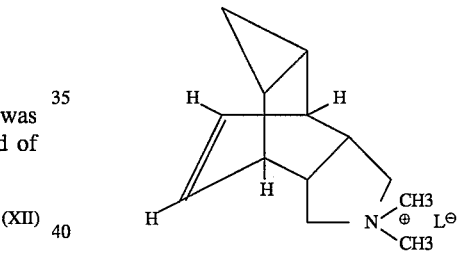

Examples 12–20 illustrate using templates of this invention under a variety of inorganic conditions to obtain crystalline products. These non-limiting examples illustrate preferred conditions of the invention.

It can be seen that one of the desirable features of this invention is that a wide variety of crystalline products can be prepared. As is the case in most molecular sieve syntheses, a given template may not necessarily produce a crystalline product or a single molecular sieve over all inorganic composition ranges.

EXAMPLE 12

$ALPO_4$ reaction 4.05 Grams of Catapal B (alumina source) were added with stirring to 6.84 grams of an 86% $H_3PO_4$ solution over a 1-hour period. An additional 1 gram of water was added to aid in stirring, which was continued for 3 hours after the Catapal addition was complete. 1.81 Grams of this stock solution was transferred to a Teflon cup of a Parr 4745 reactor. A stir bar was added and 4.45 grams of a 0.56M solution of the template of Example 7 as the hydroxide salt was added while stirring. The resultant thick white gel was stirred overnight at room temperature. The reactor was then heated to 150° C. in a Blue M oven. After 48 hours, an increase in pH was noted and a settled product was obtained.

The solids were filtered, washed with water, dried and determined by XRD to be ALPO$_4$-5.

EXAMPLE 13

ALPO4 reaction

The procedure of Example 12 was repeated, except that 3.41 grams of a 0.73M solution of the template from Example 2 as the hydroxide salt was used. After two days, the product isolated was ALPO$_4$-5.

EXAMPLE 14

ALPO$_4$ reaction

The procedure of Example 12 was repeated, except that 4.05 grams of a 0.62M solution of the template from Example 6 as the hydroxide salt was used. The product isolated was ALPO$_4$-5.

EXAMPLE 15

ALPO4 reaction

The procedure of Example 12 was repeated, except that 4.19 grams of a 0.59M solution of the template from Example 10 as the hydroxide salt was used. The product isolated was ALPO$_4$-5.

EXAMPLE 16

SAPO reaction 4.04 Grams of Catapal B were added with stirring to a mixture of 6.83 grams of an 86% H3PO$_4$ solution and 10.00 grams of water over a period of one hour. The resulting gel was aged for one hour, after which was added 0.37 grams of Cabosil M-5 fumed silica. 2.9 Grams of the resulting solution was transferred to a Teflon cup of a Parr 4745 reactor, and 3.41 grams of a 0.734M solution of the template from Example 2 (structure VII) was slowly added with stirring. The resulting reaction mixture was heated at 150° C. for 48 hours, after which a settled product was obtained. The solids were filtered, washed with water, dried and determined by XRD to be SAPO-5 with a small amount of SAPO-34.

EXAMPLE 17

SAPO reaction

The same reaction mixture as described in Example 16 was prepared, with the exception that the mixture was heated at 170° C. for 48 hours. The products from this reaction were determined by XRD to be SAPO-5 with a small amount of SAPO-34.

EXAMPLE 18

SAPO reaction

The same reaction mixture as described in Example 16 was prepared, with the exception that 4.29 grams of a 0.58M solution of the template prepared in Example 6 (structure XI) as the hydroxide salt was used instead of the template from Example 2. After heating for 48 hours at 150° C., a settled product was obtained and determined by XRD to be SAPO-5 with a trace amount of SAPO-34.

EXAMPLE 19

SAPO reaction

The same reaction mixture as described in Example 16 was prepared, with the exception that 4.45 grams of a 0.56M solution of the template prepared in Example 7 (structure XII) as the hydroxide salt was used instead of the template from Example 2. After heating for 48 hours at 150° C., a settled product was obtained and determined by XRD to be SAPO-5.

EXAMPLE 20

SAPO reaction

The same reaction mixture as described in Example 16 was prepared, with the exception that 3.83 grams of a 0.65M solution of the template prepared in Example 1 (structure VI) as the hydroxide salt was used instead of the template from Example 2. After heating for 48 hours at 150° C., a settled product was obtained and determined by XRD to be a mixture of SAPO-5 and SAPO-34.

What is claimed is:

1. A method for preparing a crystalline molecular sieve comprising oxides of one or more trivalent element(s) and oxides of one or more pentavalent element(s), said method comprising contacting under crystallization conditions one or more active sources of said oxides with a templating agent having a molecular structure of the form:

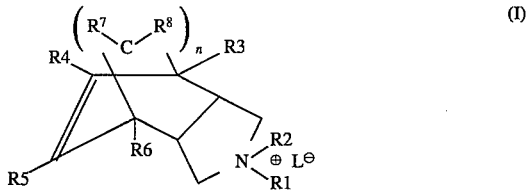

(I)

or

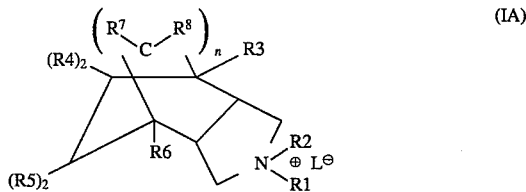

(IA)

wherein:
R1 and R2 are at each independent occurrence selected from the group consisting of hydrogen, a lower alkyl group, and when taken together, a spirocyclic group having from 3 to 6 carbon atoms;

R3, R4, R5 and R6 are at each independent occurrence selected from the group consisting of hydrogen, halogen, and a lower alkyl group;

n has at each independent occurrence a value of 1, 2, 3, or 4;

R7 and R8 are at each independent occurrence selected from the group consisting of hydrogen, and a lower alkyl group, and when n is one (1), R7 and R8 can be taken together to form a spirocyclic group having from 3 to 6 carbon atoms; and when n is two (2) or greater, one of R7 and R8 on one carbon atom can be taken together with one of R7 and R8 on an adjacent carbon atom to form a ring having from 3 to 6 carbon atoms; and L is an anion which is not detrimental to the formation of the molecular sieve;

or a molecular structure of the form:

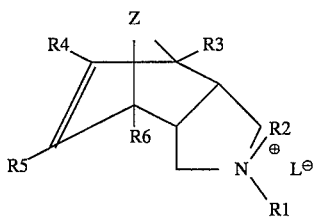
(II)

or

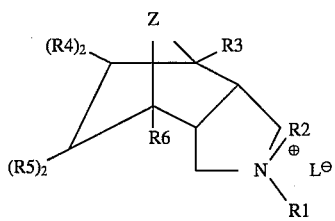
(IIA)

wherein Z is at each independent occurrence selected from the group consisting of oxygen, nitrogen, sulfur, and a hydrocarbyl radical; and R1, R2, R3, R4, R5, R6, and L are as defined above.

2. The method according to claim 1 wherein R1 and R2 are each selected from the group consisting of hydrogen, an alkyl group having from 1 to 3 carbon atoms, and when taken together, a spirocyclic group having from 4 to 5 carbon atoms.

3. The method according to claim 1 wherein R3, R4, R5 and R6 are each selected from the group consisting of hydrogen and an alkyl group having from 1 to 3 carbon atoms.

4. The method according to claim 1 wherein R7 and R8 are each selected from the group consisting of hydrogen, and an alkyl group having from 1 to 3 carbon atoms, and when n is one (1), R7 and R8 can be taken together to form a spirocyclic group having from 3 to 6 carbon atoms; and when n is two (2) or greater, one of R7 and R8 on one carbon atom can be taken together with one of R7 and R8 on an adjacent carbon atom to form a ring having from 3 to 6 carbon atoms.

5. The method according to claim 1 wherein the templating has a molecular structure of the form:

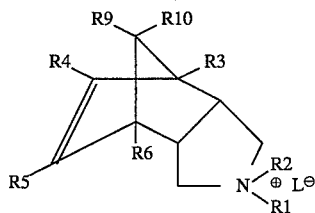

wherein:

R1, R2, R3, R4, R5, R6 and L are as defined in claim 1; and

R9 and R10 are each selected from the group consisting of hydrogen, a lower alkyl group, and when taken together, a spirocyclic group having from 3 to 6 carbon atoms.

6. The method according to claim 5 wherein R1 and R2 are selected from the group consisting of hydrogen, an alkyl group having from 1 to 3 carbon atoms, and when taken together, a spirocyclic group having from 4 to 5 carbon atoms.

7. The method according to claim 5 wherein R3, R4, R5 and R6 are each selected from the group consisting of hydrogen and an alkyl group having from 1 to 3 carbon atoms.

8. The method according to claim 5 wherein R9 and R10 are each selected from the group consisting of hydrogen, an alkyl group having from 1 to 3 carbon atoms, and when taken together, a spirocyclic group having from 3 to 6 carbon atoms.

9. The method according to claim 5 wherein R3, R4, R5, R6, R9, and R10 are the same and each is hydrogen.

10. The method of claim 9 wherein R1 and R2 are the same and each is methyl.

11. The method according to claim 9 wherein R1 is methyl, R2 is ethyl.

12. The method according to claim 9 wherein R1 and R2 are the same and each is ethyl.

13. The method according to claim 5 wherein R1 and R2 are the same and each is methyl, and R3, R4, R5, and R6, are the same and each is hydrogen, and R9 and R10 are taken together to form a spirocyclic cyclopropane ring.

14. The method according to claim 13 wherein R1 and R2 are the same and each is ethyl.

15. The method according to claim 1 wherein the templating agent has a molecular structure of the form:

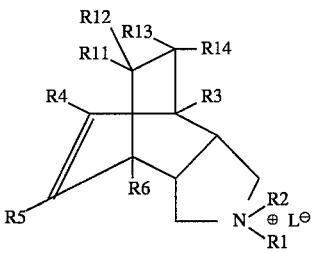

wherein:

R11, R12, R13, and R14 are each selected from the group consisting of hydrogen, and a lower alkyl group.

16. The method according to claim 15 wherein R1 and R2 are selected from the group consisting of hydrogen, an alkyl group having from 1 to 3 carbon atoms, and when taken together, a spirocyclic group having from 4 to 5 carbon atoms.

17. The method according to claim 15 wherein R3, R4, R5 and R6 are each selected from the group consisting of hydrogen and an alkyl group having from 1 to 3 carbon atoms.

18. The method according to claim 15 wherein R11, R12, R13, and R14 are each selected from the group consisting of hydrogen, and an alkyl group having from 1 to 3 carbon atoms.

19. The method according to claim 15 wherein R3, R4, R5, and R6 are the same and each is hydrogen.

20. The method according to claim 19 wherein R11, R12, R13, and R14 are the same and each is hydrogen.

21. The method according to claim 20 wherein R1 and R2 are the same and each is methyl.

22. The method according to claim 20 wherein R1 is methyl and R2 is ethyl.

23. The method according to claim 20 wherein R1 and R2 are the same and each is ethyl.

24. The method according to claim 1 wherein the templating agent has a molecular structure of the form:

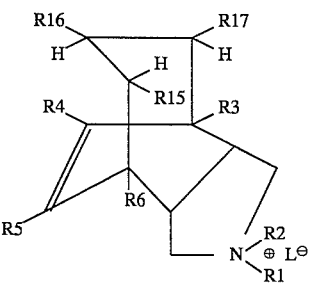

wherein:

R15, R16, and R17 are each selected from the group consisting of hydrogen, and a lower alkyl group.

25. The method according to claim 24 wherein R1 and R2 are selected from the group consisting of hydrogen, an alkyl group having from 1 to 3 carbon atoms, and when taken together, a spirocyclic group having from 4 to 5 carbon atoms.

26. The method according to claim 24 wherein R3, R4, R5 and R6 are each selected from the group consisting of hydrogen and an alkyl group having from 1 to 3 carbon atoms.

27. The method according to claim 24 wherein R15, R16, and R17 are each selected from the group consisting of hydrogen, and an alkyl group having from 1 to 3 carbon atoms.

28. The method according to claim 24 wherein R3, R4, R5, and R6 are the same and each is hydrogen.

29. The method according to claim 28 wherein R15, R16, and R17 are the same and each is hydrogen.

30. The method according to claim 29 wherein R1 and R2 are the same and each is methyl.

31. The method according to claim 29 wherein R1 is methyl and R2 is ethyl.

32. The method according to claim 1 wherein the templating agent has a molecular structure of the form:

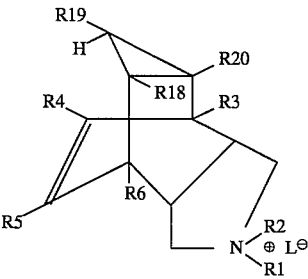

wherein:

R18, R19, and R20 are each selected from the group consisting of hydrogen, and a lower alkyl group.

33. The method according to claim 32 wherein R1 and R2 are selected from the group consisting of hydrogen, an alkyl group having from 1 to 3 carbon atoms, and when taken together, a spirocyclic group having from 4 to 5 carbon atoms.

34. The method according to claim 32 wherein R3, R4, R5 and R6 are each selected from the group consisting of hydrogen and an alkyl group having from 1 to 3 carbon atoms.

35. The method according to claim 32 wherein R18, R19, and R20 are each selected from the group consisting of hydrogen, and an alkyl group having from 1 to 3 carbon atoms.

36. The method according to claim 32 wherein R3, R4, R5, and R6 are the same and each is hydrogen.

37. The method according to claim 36 wherein R18, R19, and R20 are the same and each is hydrogen.

38. The method according to claim 37 wherein R1 and R2 are the same and each is methyl.

39. The method according to claim 1 wherein L is selected from the group consisting of fluoride, chloride, bromide, iodide, hydroxide, acetate, sulfate, and carboxylate.

40. The method according to claim 39 wherein L is hydroxide.

41. The method according to claim 1 wherein the trivalent element is aluminum.

42. The method according to claim 1 wherein the pentavalent element is phosphorous.

43. The method according to claim 1 wherein the crystalline molecular sieve further comprises an oxide of one or more tetravalent element (s).

44. The method according to claim 43 wherein the tetravalent element is silicon.

45. A method for preparing a crystalline molecular sieve having a three-dimensional microporous framework structure comprising [AlO$_2$] and [PO$_2$] oxide units, said method comprising contacting sources of said oxide unites and a templating agent having a molecular structure of the form:

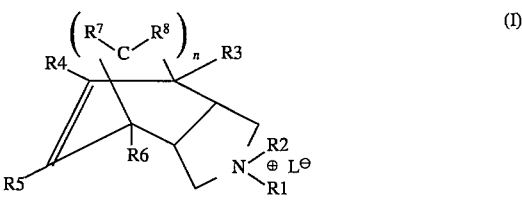

(I)

or

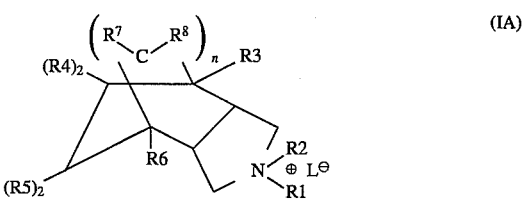

(IA)

wherein:

R1 and R2 are at each independent occurrence selected from the group consisting of hydrogen, a lower alkyl group, and when taken together, a spirocyclic group having from 3 to 6 carbon atoms;

R3, R4, R5 and R6 are at each independent occurrence selected from the group consisting of hydrogen, halogen, and a lower alkyl group;

n has at each independent occurrence a value of 1, 2, 3, or 4;

R7 and R8 are at each independent occurrence selected from the group consisting of hydrogen, and a lower alkyl group, and when n is one (1), R7 and R8 can be taken together to form a spirocyclic group having from 3 to 6 carbon atoms; and when n is two (2) or greater, one of R7 and R8 on one carbon atom can be taken together with one of R7 and R8 on an adjacent carbon atom to form a ring having from 3 to 6 carbon atoms; and L is an anion which is not detrimental to the formation of the molecular sieve;

or a molecular structure of the form:

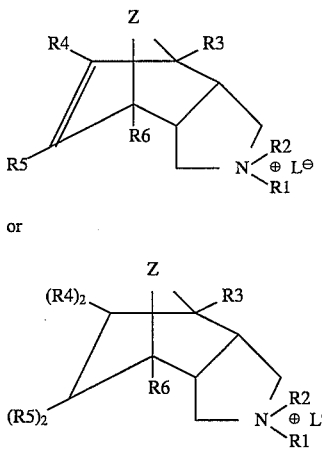 (II)

or (IIA)

wherein Z is at each independent occurrence selected from the group consisting of oxygen, nitrogen, sulfur, and an alkylene radical; and R1, R2, R3, R4, R5, R6, and L are as defined above.

46. The method according to claim 45 wherein the framework structure further comprises an oxide of at least one element other than aluminum and phosphorous which is capable of forming an oxide in tetrahedral coordination with [AlO₂] and [PO₂] oxide structural units in a crystalline molecular sieve.

47. The method according to claim 46 wherein the element other than aluminum and phosphorous is selected from the group consisting of arsenic, beryllium, boron, chromium, cobalt, gallium, germanium, iron, lithium, magnesium, manganese, silicon, titanium, vanadium, and zinc.

48. The method according to claim 46 wherein the element is selected from the group consisting of silicon, magnesium, manganese, cobalt, and zinc.

49. The method according to claim 46 wherein the element is silicon.

50. The method according to claim 45 wherein the molecular sieve is ALPO₄-5.

51. A crystalline molecular sieve comprising oxides of one or more trivalent element(s) and of one or more pentavalent element(s), and having therein a templating agent having a molecular structure of the form:

(I)

or

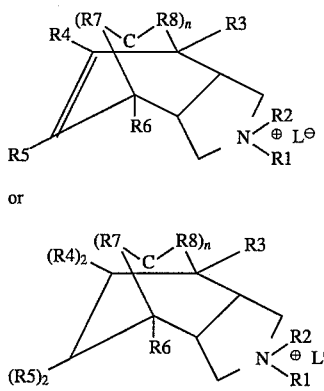 (IA)

wherein:

R1, and R2 are at each independent occurrence selected from the group consisting of hydrogen, a lower alkyl group, and when taken together, a spirocyclic group having from 3 to 6 carbon atoms;

R3, R4, R5 and R6 are at each independent occurrence selected from the group consisting of hydrogen, halogen, and a lower alkyl group;

n has at each independent occurrence a value of 1, 2, 3 or 4;

R7 and R8 are at each independent occurrence selected from the group consisting of hydrogen, a lower alkyl group, and when n is one (1), R7 and R8 can be taken together to form a spirocyclic group having 3 to 6 carbon atoms; and when n is two (2) or greater, one of R7 and R8 on one carbon atom can be taken together with one of R7 and R8 on an adjacent carbon atom to form a ring having 3 to 6 carbon atoms; and L is an anion which is not detrimental to the formation of the molecular sieve; or a molecular structure of the form:

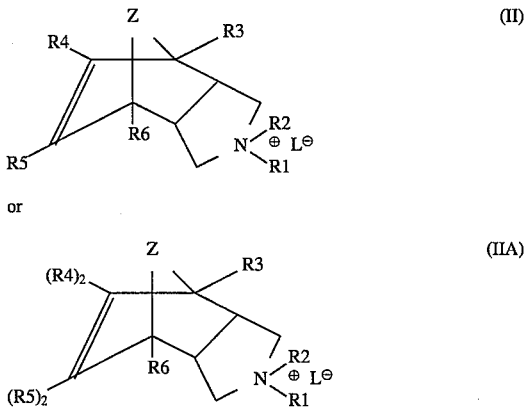

(II)

or (IIA)

wherein Z is at each independent occurrence selected from the group consisting of oxygen, nitrogen, sulfur and a hydrocarbyl radical; and R1, R2, R3, R4, R5, R6 and B are as defined above.

52. The crystalline molecular sieve of claim 51 having a molar composition, as synthesized and in the anhydrous state, as follows:

aQ:(M$_x$Al$_y$P$_z$)O$_2$ wherein:

Q is the templating agent;

a has a value in the range of greater than zero and no greater than about 0.3;

M is one or more elements capable of forming stable M—O—P, M—O—Al, or M—O—M bonds in crystalline oxide structures;

y and z each have a value of at least 0.01; and the sum of x, y, and z is 1.

53. The composition according to claim 52 wherein x has a value equal to zero.

54. The composition according to claim 52 wherein element M is selected from the group consisting of arsenic, beryllium, boron, chromium, cobalt, gallium, germanium, iron, lithium, magnesium, manganese, silicon, titanium, vanadium, and zinc.

55. The composition according to claim 54 wherein element M is selected from the group consisting of magnesium, manganese, cobalt, and zinc.

56. The composition according to claim 55 wherein element M is silicon.

57. The process of thermally treating the crystalline molecular sieve of claim 51 at a temperature of about 200° C. to about 800° C.

58. The process of thermally treating the crystalline molecular sieve of claim 52 at a temperature of about 200° C. to about 800° C.

* * * * *